US012703362B2

(12) United States Patent
Bjernetun et al.

(10) Patent No.: US 12,703,362 B2
(45) Date of Patent: Aug. 11, 2026

(54) ADAPTING OPERATION TO PRECEDING VEHICLES

(71) Applicant: Volvo Truck Corporation, Gothenburg (SE)

(72) Inventors: Johan Bjernetun, Mölnlycke (SE); Oscar Stjernberg, Gothenburg (SE); Martin Wilhelmsson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 259 days.

(21) Appl. No.: 18/480,604

(22) Filed: Oct. 4, 2023

(65) Prior Publication Data

US 2024/0149877 A1 May 9, 2024

(30) Foreign Application Priority Data

Nov. 8, 2022 (EP) .................................... 22206103

(51) Int. Cl.
*B60W 30/16* (2020.01)

(52) U.S. Cl.
CPC ......... *B60W 30/16* (2013.01); *B60W 2300/12* (2013.01); *B60W 2554/80* (2020.02); *B60W 2556/65* (2020.02)

(58) Field of Classification Search
CPC ............. B60W 30/16; B60W 2556/65; B60W 2554/80; B60W 2300/12
USPC .......................................................... 701/93
See application file for complete search history.

(56) References Cited

U.S. PATENT DOCUMENTS

| | | | | |
|---|---|---|---|---|
| 8,996,274 | B2 * | 3/2015 | Shida | B60W 30/16 701/96 |
| 2016/0375905 | A1 | 12/2016 | Park et al. | |
| 2017/0106861 | A1 | 4/2017 | Oh et al. | |
| 2018/0037227 | A1 | 2/2018 | D'sa et al. | |
| 2018/0065630 | A1 | 3/2018 | Tamura | |
| 2018/0093666 | A1 * | 4/2018 | Kim | B60W 30/143 |

FOREIGN PATENT DOCUMENTS

| | | | | |
|---|---|---|---|---|
| DE | 10254401 | A1 * | 6/2004 | B60K 31/0008 |
| DE | 102016014553 | A1 | 5/2017 | |
| DE | 102019200209 | A1 | 7/2020 | |

(Continued)

OTHER PUBLICATIONS

Extended European Search Report for European Patent Application No. 22206103.8, mailed May 12, 2023, 10 pages.

*Primary Examiner* — Erin M Piateski
*Assistant Examiner* — Michael T Dowling
(74) *Attorney, Agent, or Firm* — Withrow & Terranova, PLLC

(57) ABSTRACT

A computer-implemented method comprises receiving, by a processor device of a computer system, from at least one data acquisition device of a prime vehicle, measurement data of each of at least two preceding vehicles preceding the prime vehicle; determining, by the processor device, a performance consistency of each of the at least two preceding vehicles based on the measurement data; selecting, by the processor device, a standard vehicle of the at least two preceding vehicles based on the performance consistency of each of the at least two preceding vehicles; and adapting, by the processor device, operation of the prime vehicle based on the standard vehicle.

18 Claims, 8 Drawing Sheets

(56) References Cited

FOREIGN PATENT DOCUMENTS

| | | | |
|---|---|---|---|
| EP | 3342669 | A | 7/2018 |
| JP | 2017150422 | A | 8/2017 |
| JP | 2019111867 | A | 7/2019 |

* cited by examiner

ADAPTING OPERATION TO PRECEDING VEHICLES

RELATED APPLICATIONS

The present application claims priority to European Patent Application No. 22206103.8, filed on Nov. 8, 2022, and entitled "ADAPTING OPERATION TO PRECEDING VEHICLES," which is incorporated herein by reference in its entirety.

TECHNICAL FIELD

The disclosure relates generally to adaptive cruise control. In particular aspects, the disclosure relates to adapting operation to preceding vehicles. The disclosure can be applied in heavy-duty vehicles, such as trucks, buses, and construction equipment. Although the disclosure may be described with respect to a particular vehicle, the disclosure is not restricted to any particular vehicle.

BACKGROUND

Adaptive Cruise Control (ACC) is a commonly utilized feature in vehicles today since it allows the vehicle to control for instance vehicle speed in relation to an immediately preceding vehicle.

Adaptive Cruise Control (ACC) is a common feature in vehicles today, in which a vehicle such as a car or a truck monitors a movement pattern of another immediately preceding vehicle and adapt movement pattern of the vehicle to that of the vehicle ahead.

However, if the immediately preceding vehicle is operating in an unstable manner, the ACC will adapt accordingly, which is undesirable.

SUMMARY

According to a first aspect of the disclosure, A computer-implemented method is provided comprising receiving, by a processor device of a computer system, from at least one data acquisition device of a prime vehicle, measurement data of each of at least two preceding vehicles preceding the prime vehicle, determining, by the processor device, a performance consistency of each of the at least two preceding vehicles based on the measurement data, selecting, by the processor device, a standard vehicle of the at least two preceding vehicles based on the performance consistency of each of the at least two preceding vehicles and adapting, by the processor device, operation of the prime vehicle based on the standard vehicle.

The first aspect of the disclosure may seek to resolve an issue of an immediately preceding vehicle being conveyed in an unstable manner during ACC. A technical benefit may include to find another more stable preceding vehicle to which vehicle operation is adapted.

In some examples, the selecting of a standard vehicle comprises selecting as the standard vehicle the vehicle of the at least two preceding vehicles considered to have a higher performance consistency. A technical benefit may include adaptation of prime vehicle operation to a preceding vehicle having a stable movement pattern.

In some examples, the processor device determines a distance from the prime vehicle to each of the at least two preceding vehicles based on the measurement data, wherein the determining of a performance consistency of each of the at least two preceding vehicles comprises assigning a lower performance consistency with increasing distance. A technical benefit may include preceding vehicles on a greater distance from the prime vehicle may be less relied upon than preceding vehicles being closer.

In some examples, the processor device determines a number of vehicles located between the prime vehicle and each of the at least two preceding vehicles based on the measurement data, wherein the determining of a performance consistency of each of the at least two preceding vehicles comprises assigning a lower performance consistency with an increasing number of vehicles. A technical benefit may include Thus, a preceding vehicle being located a greater number of vehicles ahead of the prime vehicle may be less relied upon than a preceding vehicle being located a lesser number of vehicles ahead of the prime vehicle.

In some examples, the processor device determines that the performance consistency of two immediately preceding vehicles fail to comply with a performance consistency criterion and determines that performance consistency of a further preceding vehicle complies with the performance consistency criterion; wherein selecting standard vehicle comprises selecting said further preceding vehicle as the standard vehicle. Hence, if the performance of a preceding vehicle is not considered sufficiently high, the preceding vehicle will not be a standard vehicle candidate.

In some examples, no adapting of the operation of the prime vehicle is performed by the processor device if it is determined that none of the preceding vehicles has a determined performance consistency complying with the performance consistency criterion.

In some examples, the adapting of the operation of the prime vehicle further comprises maintaining, by the processor device, a minimum distance to an immediately preceding vehicle. For safety reasons, a minimum distance to an immediately preceding vehicle may be maintained.

In some examples, the adapting of the operation of the prime vehicle further comprises discontinuing, by the processor device, the adapting upon the minimum distance to the immediately preceding vehicle cannot be maintained. For safety reasons, if a minimum distance to an immediately preceding vehicle cannot be maintained during adoption, a driver may take over operation of the prime vehicle.

In some examples, the receiving of measurement data from at least one data acquisition device comprises receiving, by the processor device, the measurement data from a radar, lidar or camera sensor of the prime vehicle.

In some examples, wherein the receiving of measurement data from at least one data acquisition device comprises receiving, by the processor device, the measurement data from a wireless communication device of the prime vehicle.

In some examples, the wireless communication device is configured to receive the measurement data by establishing wireless communication with each of the at least two preceding vehicles.

In some examples, the wireless communication device is configured to receive the measurement data by establishing wireless communication with a remotely located device having access to the measurement data of each of the at least two preceding vehicles.

In some examples, the performance consistency of each of the at least two preceding vehicles is determined based on variation in speed, wherein the performance consistency is considered higher for a smaller variation in speed and lower for a greater variation in speed.

In some examples, the performance consistency of each of the at least two preceding vehicles is determined based on variation in acceleration, wherein the performance consistency is considered higher for a smaller variation in acceleration and lower for a greater variation in acceleration.

In some examples, the performance consistency of each of the at least two preceding vehicles is determined based on variation in deceleration, wherein the performance consistency is considered higher for a smaller variation in deceleration and lower for a greater variation in deceleration.

Considering various characteristics of preceding vehicles enables great versatility in adaption of prime vehicle operation.

According to a second aspect of the disclosure, a computer system is provided comprising the processor device configured to perform the method of the first aspect.

In some examples, a vehicle is provided comprising the processor device to perform the method of the first aspect.

In some examples, a computer program product is provided comprising program code for performing, when executed by the processor device, the method of the first aspect.

In some examples, a control system is provided comprising one or more control units configured to perform the method according to the first aspect.

In some examples, a non-transitory computer-readable storage medium is provided comprising instructions, which when executed by the processor device, cause the processor device to perform the method of the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Adaptive Cruise Control (ACC) is a common feature in vehicles today, in which a vehicle such as a car or a truck monitors a movement pattern of another immediately preceding vehicle and adapts movement pattern of the vehicle to that of the vehicle ahead.

Figure 1:
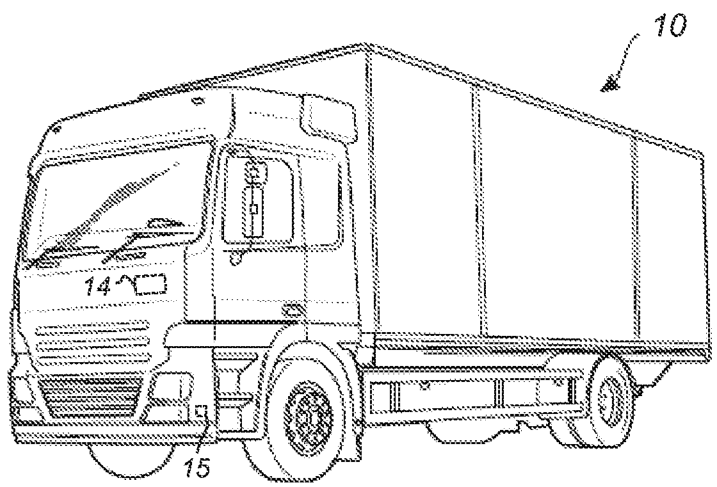
FIG. 1 illustrates a vehicle in the form of a truck in which examples of the present disclosure may be implemented.

FIG. 1 illustrates a vehicle in the form of a truck 10 in which examples of the present disclosure may be implemented, the truck 10 being equipped with a computer system 14 e.g., in the form of a so-called Electronic Control Unit (ECU) controlling operation of the truck 10. For implementing ACC, the ECU 14 is typically in communicative connection with one or more sensors 15 of the truck 10, such as e.g., radar, lidar, cameras, etc., for monitoring the surroundings of the vehicle and in particular the preceding vehicle in order to determine a movement pattern of the preceding vehicle.

By collecting measurement data from the sensor 15, the ECU 14 may thus determine a movement pattern of the immediately preceding vehicle, for instance speed, acceleration, deceleration or distance to the truck 10 and adapt the movement pattern of the truck 10 to that of the preceding vehicle. As is understood, if the movement pattern of the preceding vehicle is unstable in terms of for instance heavy deceleration and/or acceleration, sudden braking maneuvers, etc., the movement pattern of the truck 10 (as controlled by the ECU 14 based on measurement data from the sensor 15 to adapt to the preceding vehicle) will also be unstable.

Although the vehicle 10 in FIG. 1 is depicted as a heavy-duty truck, examples of the present disclosure may be implemented in other types of vehicles, such as in passenger cars, busses, light-weight trucks, mid-weight trucks, construction equipment, motorcycles, marine vessels, etc.

Figure 2:
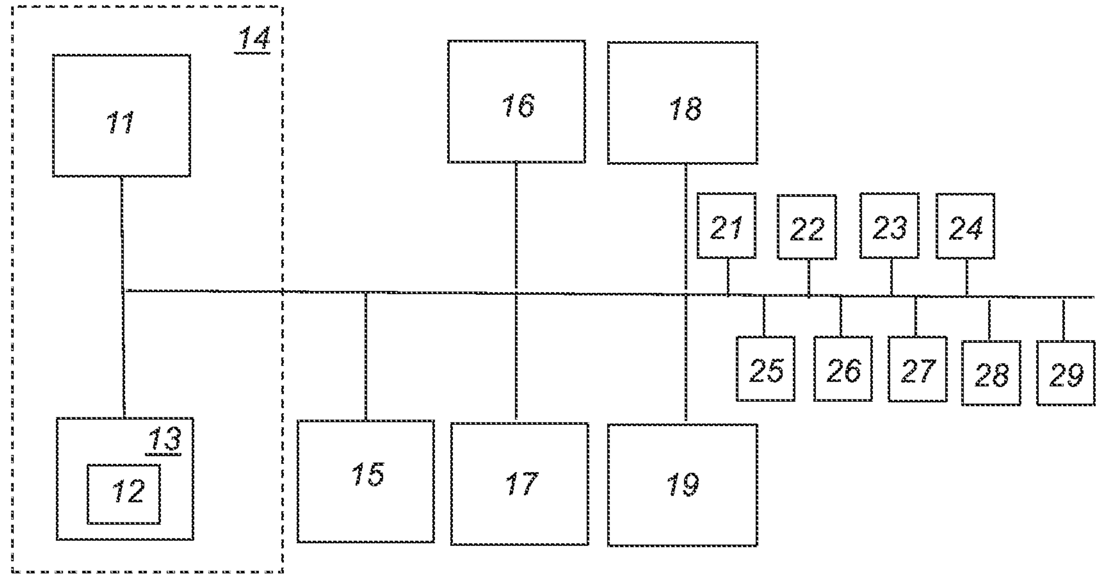
FIG. 2 shows an exemplary system diagram of a computer system with which the truck of FIG. 1 is equipped according to the present disclosure.

FIG. 2 shows an exemplary system diagram of the computer system 14 with which the truck 10 of FIG. 1 is equipped according to the present disclosure. The computer system 14 will in the following be exemplified by an ECU.

The ECU 14 generally comprises a processing unit 11 embodied in the form of one or more microprocessors arranged to execute a computer program 12 downloaded to a storage medium 13 associated with the microprocessor, such as a Random Access Memory (RAM), a Flash memory or a hard disk drive. The processing unit 11 is arranged to cause the ECU 14 to perform desired operations when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc. The processing device 11 will in the following be referred to as a central processing unit (CPU).

The ECU 14 may further be in communicative connection comprise a wireless transmitter/receiver 16 (commonly referred to as a transceiver) configured to communicate with remote devices such as e.g., cloud servers, other vehicles and/or appropriate components arranged in the truck 10 being capable of wireless communication. The wireless communication of the transceiver may be performed for instance via radio frequency (RF), Bluetooth, a wi-fi provided by a local router, etc. Similar to the sensor 15, the transceiver 16 may further act as a data acquisition device for collecting measurement data 21 of other vehicles based on which the ECU 14 performs the above-discussed ACC.

Further shown in FIG. 2 is the sensor 15 (radar, lidar, camera, etc.) which also may be used as a data acquisition device for collecting measurement data of other vehicles. As is understood, the data acquisition undertaken by the ECU 14 to collect the measurement data may be performed by collecting the data both via the transceiver 16 and the sensor 15.

The ECU 14 according to examples of the present disclosure may further be in communication with other subsystems for performing ACC, such as for instance an engine control module (ECM) 17 for controlling speed and acceleration/deceleration of the truck 10, a transmission control module (TCM) 18 changing gears, brake control module (BCM) 19 for controlling braking, etc. Communication between the various components illustrated in FIG. 2 may occur via e.g., a Controller Area Network (CAN), a Local Interconnect Network (LIN), Ethernet, etc.

Further illustrated in FIG. 2 are performance consistency 22 of preceding vehicles, performance consistency criterion 23, distance 24 to preceding vehicles, number 25 of vehicles located between the vehicle 10 and preceding vehicles, minimum distance 26 to an immediately preceding vehicle and a preceding vehicle performance characteristic such as variation in speed 27, acceleration 28 or deceleration 29, all of which will be discussed in detail in the following.

Figure 3:
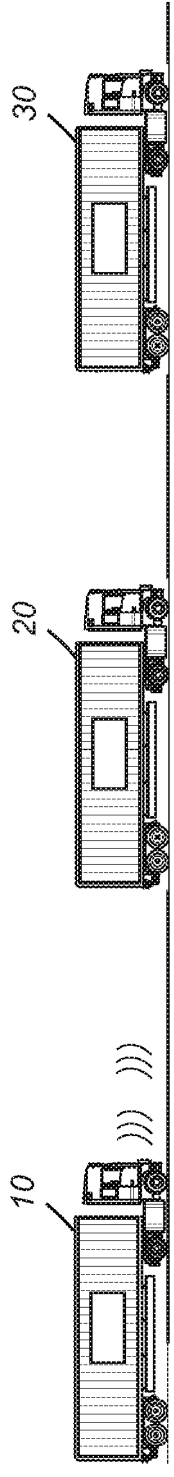
FIG. 3 illustrates an example of the disclosure where a prime vehicle is to adapt operation to a preceding vehicle.

FIG. 3 illustrates an example of the disclosure where a prime vehicle 10 is to adapt operation to a preceding vehicle. Now, as discussed, in a scenario where the movement pattern of an immediately preceding vehicle 20 is unstable, ACC based on the measurement data collected by e.g., a radar sensor 15 and processed by the ECU 14 will adapt to that pattern and inevitably cause the prime vehicle 10 to also move in an unstable fashion.

Assuming for instance that settings of the ECU 14 of the prime vehicle 10 stipulates that a specific distance is to be maintained between the prime vehicle 10 and the immediately preceding vehicle 20 by the ECU 14 controlling e.g. the ECM 17 and the TCM 19 based on measured distance data collected by the radar 15; if the immediately preceding vehicle 20 performs sudden accelerations and/or decelerations, the movement pattern of the prime vehicle 10 will be similar if the distance between the two vehicles 10, 20 is to be maintained.

Figure 4:
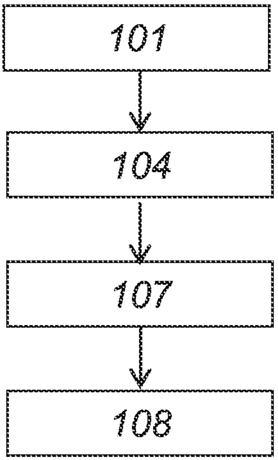
FIG. 4 shows a flowchart illustrating an example method according to the present disclosure.

This issue is resolved in an example method of the present disclosure by the ECU 14 of the prime vehicle 10. Reference will further be made to FIG. 4 showing a flowchart illustrating this example method.

Hence, the CPU 11 of the ECU 14 receives in 101, from the sensor 15 (in this example a radar device), measurement data of each of at least two preceding vehicles 20, 30. In this example, the measurement data is received from the immediately preceding vehicle 20 (referred to in the following as the first vehicle) and the next preceding vehicle 30 (referred to in the following as the second vehicle). However, any two (or more) preceding vehicles may be monitored for collecting the measurement data for ACC to be undertaken by the ECU 14. The preceding vehicles 20, 30, 40 may be located in a same or adjacent lane as that of the prime vehicle 10.

After having received the measurement data, the CPU 11 determines in 104 a performance consistency of each of the first vehicle 20 and the second vehicle 30 based on the measurement data. For example, assuming that the radar sensor 15 measures speed of each of the first and second vehicle 20, 30 over a time period and determines from the measurement data that the first vehicle 20 operates at a speed ranging from 60 to 80 km/h while the second vehicle 30 operates at a speed in the range from 65-75 km/h.

From these sets of measurement data, the CPU 11 determines in 104 that the second vehicle 30 has a higher performance consistency than the first vehicle 20 since it shows a smaller variation (±5 km/h from the midrange value) in speed than the of the first vehicle 20 (±10 km/h from the midrange value). Other properties for determining performance consistency may be one or more of acceleration, deceleration or ability to maintain position in a road lane, etc.

In this example, the CPU 11 of the prime vehicle 10 will select in 107, as a standard vehicle, the vehicle having the highest performance consistency—i.e., the second vehicle 30—and adapt operation of the prime vehicle 10 in 108 based on the second vehicle 30 being the selected standard vehicle.

This adaptation may for instance be embodied by the CPU 11 of the ECU 14 controlling the ECM 17 to adapt the speed of the prime vehicle 10 such that it tracks that of the second vehicle 30. In an example, if the second vehicle 30 increases speed, the CPU 11 of the ECU 14 may control the ECM 17 to increase the speed of the prime vehicle 10 accordingly, while if the second vehicle decreases speed, the CPU 11 of the ECU 14 may control the ECM 17 to correspondingly decrease the speed of the prime vehicle 10.

In another example, the ECU 14 may perform adaptation by controlling acceleration/deceleration of the prime vehicle 10 based on the selected standard vehicle 30. For instance, the ECU 14 may determine that a greater acceleration/deceleration of the prime vehicle is allowed if the standard vehicle 30 is considered to have a high performance consistency.

In yet another example, the ECU 14 may perform adaptation by controlling distance of the prime vehicle 10 to one or more preceding vehicles based on the selected standard vehicle 30. For instance, the ECU 14 may determine that a greater distance of the prime vehicle 10 to preceding vehicles should be maintained if the standard vehicle 30 is considered to have a low performance consistency.

In an example of the present disclosure, the CPU 11 of the prime vehicle 10 will—based on the measurement data collected via the sensor 15—determine a distance to the first vehicle 20 and if a minimum allowed distance to the first vehicle 20 cannot be maintained for safety reasons, the ECU 14 may decrease the speed of the prime vehicle and/or may discontinue the performed ACC and a driver of the prime vehicle 10 will manually take over operation of the prime vehicle (possibly upon being alerted by the ECU 14 to do so), or in some other appropriate manner adjust performance of the ACC accordingly.

As is understood, while the CPU 11 selects the standard vehicle as the vehicle to adapt operation to, the ECU 14 may continuously monitor other vehicles and objects in the surroundings, in view of which navigation of the prime vehicle 10 is performed. For instance, for safety reasons, the prime vehicle 10 may maintain a minimum distance to other vehicles and objects.

Again with reference to the scenario illustrated in FIG. 2, a distance from the prime vehicle 10 to the preceding first and second vehicles 20, 30 is in an example considered for performing a confidence assessment when determining the performance consistency of the vehicles 20, 30.

Figure 5:
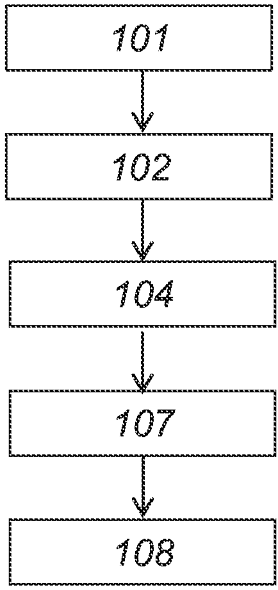
FIG. 5 shows a flowchart illustrating another example method according to the present disclosure.

FIG. 5 shows a flowchart illustrating a method according to this example.

Assuming that a distance d from the prime vehicle 10 to the second vehicle 30 exceeds a distance threshold value T, i.e., d>T as determined in 102 based on the measurement data received in 101; the CPU 11 of the ECU 14 may thus determine that the performance consistency of the second vehicle 30 cannot be relied on to the same extent as in a scenario where the distance d is shorter.

In one example, if d>T, the second vehicle 30 may not be considered at all when selecting standard vehicle in 104.

In another example, the CPU 11 makes the assessment after having determined the distance d in 102 that the performance consistency cannot be relied upon to the same extent as in the example of FIG. 3. For instance, the CPU 11 may determine in 104 that the above-mentioned variation in speed (i.e. 5 km/h) of the second vehicle 30 from the midrange value (i.e. 70 km/h) should be indexed with a confidence metric of, say, 0.4 if d>T, effectively resulting in a variation from the midrange value of 5/0.4=12.5 km/h, in which case the first vehicle 20 will be considered to present a higher performance consistency and thus be selected as the standard vehicle used by the CPU 11 in 107 for adaption of the operation, e.g. speed, of the prime vehicle 10 to the selected standard vehicle 20 in 108.

In yet an example, the performance consistency of the preceding vehicles 20, 30 is set to gradually decrease with continuously increasing distance.

Thus, a preceding vehicle 30 on a greater distance from the prime vehicle 10 may be less relied upon than a preceding vehicle 20 being located on a lesser distance from the prime vehicle 10.

Figure 6:
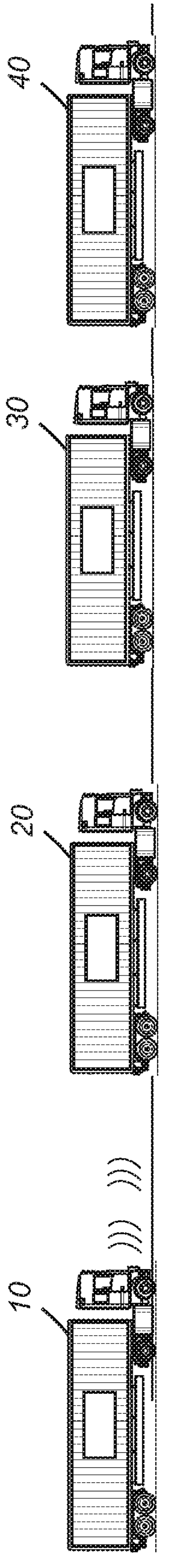
FIG. 6 illustrates another example scenario of adapting operation to a preceding vehicle according to the present disclosure.
Figure 7:
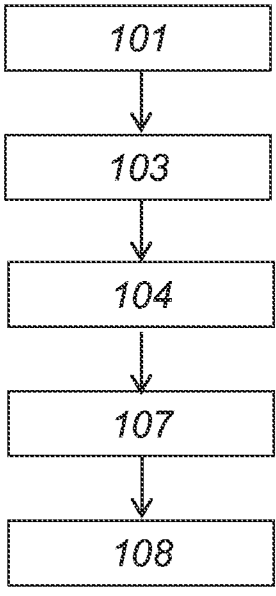
FIG. 7 shows a flowchart illustrating a further example method according to the present disclosure.

FIG. 6 illustrates another example scenario of adapting operation to a preceding vehicle according to the present disclosure, where reference also will be made to FIG. 7 showing a flowchart illustrating a further example method, in which it is assumed that the CPU 11 of the prime vehicle 10 receives in 101 measurement data acquired by the sensor 15 from three preceding vehicles; the first vehicle 20, the second vehicle 30 and a third vehicle 40.

In this example, a number of vehicles located between the prime vehicle 10 and each of the preceding vehicles 20, 30, 40 is determined in 103.

Assuming in 104 that the CPU 11 based on the measurement data determines that the first vehicle 20 has a speed variation of ±10 km/h from the midrange value of 70 km/h, while the second vehicle 30 shows a speed variation of ±15 km/h and the third vehicle 40 has a variation of ±7 km/h. Unless any confidence assessment would be made (cf. FIG. 4), the vehicle showing a lowest speed variation and thus highest performance consistency would be selected as the standard vehicle to which prime vehicle adaption will be performed (i.e. the third vehicle 40).

However, in this example, the number of vehicles located between the prime vehicle and the preceding vehicles 20, 30, 40 are taken into account for a confidence assessment.

In one example, the CPU 11 may conclude for instance that a preceding vehicle being located more than a maximum allowed number of vehicles ahead of the prime vehicle 10 will not be considered at all when selecting standard vehicle in 104.

In another example, a confidence metric is set wherein since two vehicles 20, 30 are located between the prime vehicle 10 and the third vehicle 40, a confidence metric of, say, 0.6, is set for the third vehicle 40, effectively resulting in a variation of 7/0.6=11.7 km/h. Hence, when making a confidence assessment, the third vehicle 40 will no longer be considered to have the highest performance consistency. Rather, the first vehicle 20 now has the lowest speed variation and thus the highest performance consistency (even without making a confidence assessment for the second vehicle 30) and will thus be selected as the standard vehicle in 107 by the CPU 11, and adaption will be undertaken by the CPU in 108 accordingly.

Thus, a preceding vehicle 40 being located a greater number of vehicles ahead of the prime vehicle 10 may be less relied upon than a preceding vehicle 20 being located a lesser number of vehicles ahead of the prime vehicle 10.

Figure 8:
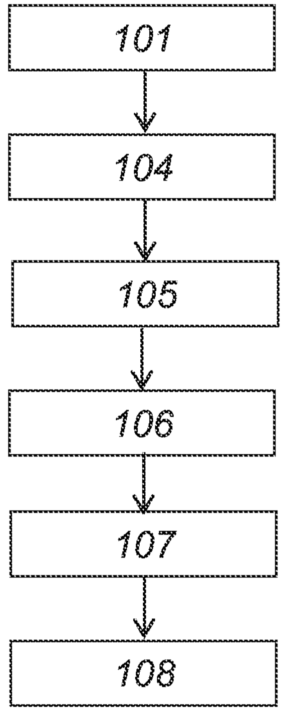
FIG. 8 shows a flowchart illustrating another example method according to the present disclosure.

Again with reference to FIG. 6 and a flowchart of FIG. 8 showing another example method, in an example the CPU 11 of the prime vehicle 10 receives data from the sensor 15 of two preceding vehicles in 101, in this case the two immediately preceding vehicles 20, 30, and will only consider a further preceding vehicle if the performance consistency of the first vehicle 20 and the second vehicle 30 is not sufficiently high.

Thus, the CPU 11 determines the performance consistency of the first vehicle 20 and the second vehicle 30 in 104 based on the measurement data.

However, in this example, the CPU determines in 105 that the first vehicle 20 and the second vehicle 30 have a performance consistency that fail to comply with an operational consistency criterion, such as not exceeding a minimum operational consistency threshold.

The CPU 11 will therefore determine based on the measurement data of the sensor 15 whether or not the third vehicle 40 have a performance consistency that complies with the operational consistency criterion in 106, and if so, select the third vehicle 40 as a standard vehicle in 107 and adapt the operation of the prime vehicle 10 to the third vehicle 40 in 108.

In a further example of the present disclosure, rather than using the sensor 15 as a data acquisition device as has been described throughout the examples hereinabove, the CPU 11 will use the wireless transceiver 16 for acquiring the measurement data based on which operational consistency is determined.

Figure 9:
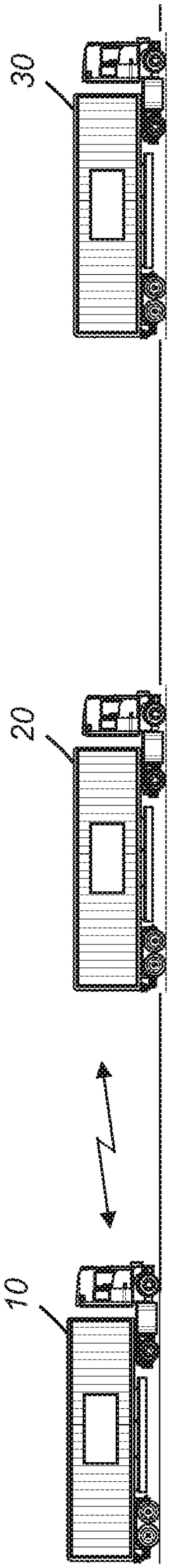
FIG. 9 illustrates an example of a prime vehicle acquiring measurement data utilizing a wireless transceiver according to the present disclosure.

With reference to FIG. 9, the prime vehicle 10 will, in order to receive the measurement data from the preceding vehicles 20, 30 as described in 101 throughout the previously described flowcharts, communicate directly with each of the preceding vehicles 20, 30 and thus acquire the appropriate measurement data (such as the speed variation figures discussed hereinabove) over a wireless communication channel set up between the transceiver 16 and a corresponding wireless communication device of each of the preceding vehicles 20, 30.

Figure 10:
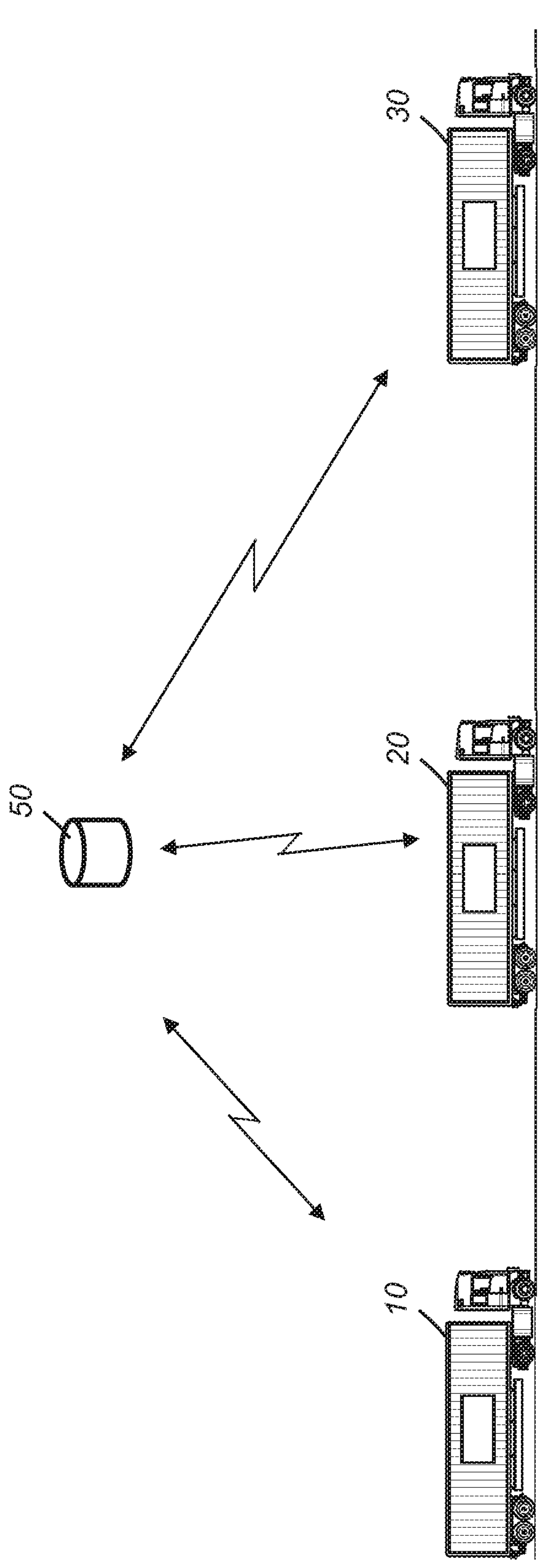
FIG. 10 illustrates an example of a prime vehicle acquiring measurement data utilizing a wireless transceiver and a server according to the present disclosure.

With reference to FIG. 10, in yet an example the prime vehicle 10 will, in order to receive the measurement data from the preceding vehicles 20, 30 as described in 101 throughout the previously described flowcharts, communicate with a remotely located device 50 such as a cloud server.

The cloud server 50 will in turn communicate with each of the preceding vehicles 20, (unless the measurement data is already stored at the server 50) and thus acquire the appropriate measurement data and respond to the transceiver 16 over the wireless communication channel set up between the transceiver 16 and the cloud server. The prime vehicle 10 may utilize the sensor 15, such as a camera, to track movement pattern of preceding vehicles even if measurement data is acquired via the transceiver 16.

Figure 11:
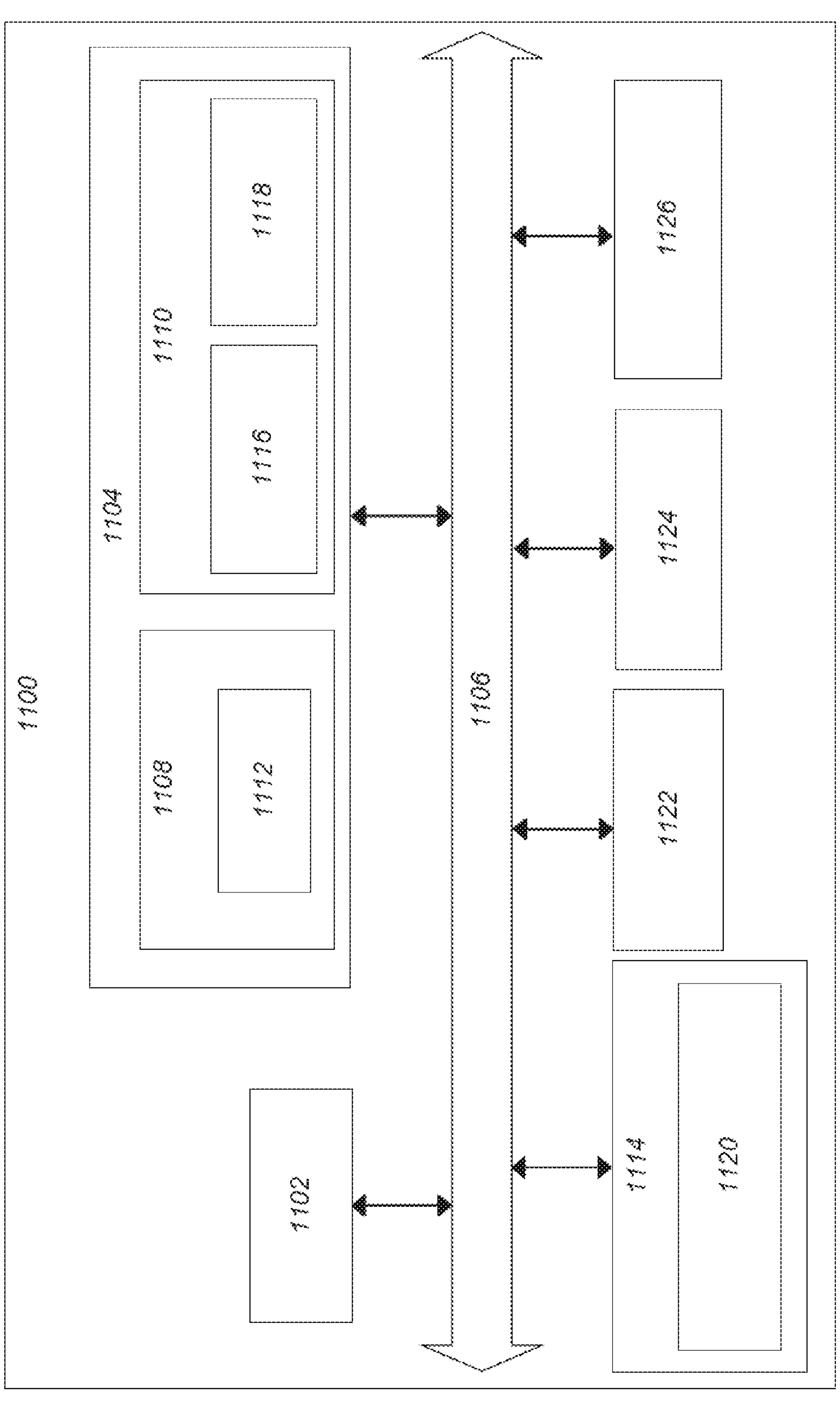
FIG. 11 is a schematic diagram of a computer system for implementing examples disclosed herein.

FIG. 11 is a schematic diagram of a computer system 1100 for implementing examples disclosed herein. The computer system 1100 is adapted to execute instructions from a computer-readable medium to perform these and/or any of the functions or processing described herein. The computer system 1100 may be connected (e.g., networked) to other machines in a LAN, an intranet, an extranet, or the Internet. While only a single device is illustrated, the computer system 1100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1100 may comprise at least one computing device or electronic device capable of including firmware, hardware, and/or executing software instructions to implement the functionality described herein. The computer system 1100 may include a processor device 1102 (may also be referred to as a control unit), a memory 1104, and a system bus 1106. The computer system 1100 may include at least one computing device having the processor device 1102. The system bus 1106 provides an interface for system components including, but not limited to, the memory 1104 and the processor device 1102. The processor device 1102 may include any number of hardware components for conducting data or signal processing or for executing computer code stored in memory 1104. The processor device 1102 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1106 may be any of several types of bus structures that may further interconnect to a memory bus (with or without a memory controller), a peripheral bus, and/or a local bus using any of a variety of bus architectures. The memory 1104 may be one or more devices for storing data and/or computer code for completing or facilitating methods described herein. The memory 1104 may include database components, object code components, script components, or other types of information structure for supporting the various activities herein. Any distributed or local memory device may be utilized with the systems and methods of this description. The memory 1104 may be communicably connected to the processor device 1102 (e.g., via a circuit or any other wired, wireless, or network connection) and may include computer code for executing one or more processes described herein. The memory 1104 may include non-volatile memory 1108 (e.g., read-only memory (ROM), erasable programmable read-only memory (EPROM), electrically erasable programmable read-only memory (EEPROM), etc.), and volatile memory 1110 (e.g., random-access memory (RAM)), or any other medium which can be used to carry or store desired program code in the form of machine-executable instructions or data structures and which can be accessed by a computer or other machine with a processor device 1102. A basic input/output system (BIOS) 1112 may be stored in the non-volatile memory 1108 and can include the basic routines that help to transfer information between elements within the computer system 1100.

The computer system 1100 may further include or be coupled to a non-transitory computer-readable storage medium such as the storage device 1114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1114 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1114 and/or in the volatile memory 1110, which may include an operating system 1116 and/or one or more program modules 1118. All or a portion of the examples disclosed herein may be implemented as a computer program product 1120 stored on a transitory or non-transitory computer-usable or computer-readable storage medium (e.g., single medium or multiple media), such as the storage device 1114, which includes complex programming instructions (e.g., complex computer-readable program code) to cause the processor device 1102 to carry out actions described herein. Thus, the computer-readable program code can comprise software instructions for implementing the functionality of the examples described herein when executed by the processor device 1102. The processor device 1102 may serve as a controller or control system for the computer system 1100 that is to implement the functionality described herein.

The computer system 1100 also may include an input device interface 1122 (e.g., input device interface and/or output device interface). The input device interface 1122 may be configured to receive input and selections to be communicated to the computer system 1100 when executing instructions, such as from a keyboard, mouse, touch-sensitive surface, etc. Such input devices may be connected to the processor device 1102 through the input device interface 1122 coupled to the system bus 1106 but can be connected through other interfaces such as a parallel port, an Institute of Electrical and Electronic Engineers (IEEE) 1394 serial port, a Universal Serial Bus (USB) port, an IR interface, and the like. The computer system 1100 may include an output device interface 1124 configured to forward output, such as to a display, a video display unit (e.g., a liquid crystal display (LCD) or a cathode ray tube (CRT)). The computer system 1100 may also include a communications interface 1126 suitable for communicating with a network as appropriate or desired.

The operations described in any of the exemplary aspects herein are described to provide examples and discussion. The operations may be performed by hardware components, may be embodied in machine-executable instructions to cause a processor to perform the operations, or may be performed by a combination of hardware and software. Although a specific order of operations may be shown or described, the order of the operations may differ. In addition, two or more operations may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, operations, elements, and/or components, but do not preclude the presence or addition of one or more other features, integers, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer-implemented method, comprising:

receiving, by a processor device of a computer system, from at least one data acquisition device of a prime vehicle, measurement data of each of at least two preceding vehicles preceding the prime vehicle;

determining, by the processor device, a performance consistency of each of the at least two preceding vehicles based on the measurement data, the performance consistency of each of the at least two preceding vehicles being based on at least one of variation in speed or acceleration, wherein the performance consistency is considered higher for a smaller variation in speed or acceleration and lower for a greater variation in speed or acceleration;

selecting, by the processor device, a standard vehicle of the at least two preceding vehicles based on the performance consistency of each of the at least two preceding vehicles; and adapting, by the processor device, operation of the prime vehicle based on the standard vehicle.

2. The method of claim 1, the selecting of a standard vehicle comprising selecting as the standard vehicle the vehicle of the at least two preceding vehicles considered to have a higher performance consistency.

3. The method of claim 1, further comprising:

determining, by the processor device, a distance from the prime vehicle to each of the at least two preceding vehicles based on the measurement data, wherein the determining of a performance consistency of each of the at least two preceding vehicles comprises assigning a lower performance consistency with increasing distance.

4. The method of claim 1, further comprising:

determining, by the processor device, a number of vehicles located between the prime vehicle and each of the at least two preceding vehicles based on the measurement data, wherein the determining of a performance consistency of each of the at least two preceding vehicles comprises assigning a lower performance consistency with an increasing number of vehicles.

5. The method of claim 1, further comprising:

determining, by the processor device, that the performance consistency of two immediately preceding vehicles fail to comply with a performance consistency criterion; and determining, by the processor device, that performance consistency of a further preceding vehicle complies with the performance consistency criterion; wherein selecting standard vehicle comprises selecting said further preceding vehicle as the standard vehicle.

6. The method of claim 5, wherein no adapting of the operation of the prime vehicle is performed, by the processor device, if it is determined that none of the preceding vehicles has a determined performance consistency complying with the performance consistency criterion.

7. The method of claim 1, wherein the adapting of the operation of the prime vehicle further comprises maintaining, by the processor device, a minimum distance to an immediately preceding vehicle.

8. The method of claim 1, further comprising discontinuing, by the processor device, attempting to maintain a minimum distance to the immediately preceding vehicle when the minimum distance to the immediately preceding vehicle cannot be maintained.

9. The method of claim 1, wherein the receiving of measurement data from at least one data acquisition device comprises receiving, by the processor device, the measurement data from a radar, lidar or camera sensor of the prime vehicle.

10. The method of claim 1, wherein the receiving of measurement data from at least one data acquisition device comprises receiving, by the processor device, the measurement data from a wireless communication device of the prime vehicle.

11. The method of claim 10, wherein the wireless communication device is configured to receive the measurement data by establishing wireless communication with each of the at least two preceding vehicles.

12. The method of claim 10, wherein the wireless communication device is configured to receive the measurement data by establishing wireless communication with a remotely located device having access to the measurement data of each of the at least two preceding vehicles.

13. The method of claim 1, wherein the performance consistency of each of the at least two preceding vehicles is determined based on variation in deceleration, wherein the performance consistency is considered higher for a smaller variation in deceleration and lower for a greater variation in deceleration.

14. The computer system comprising the processor device configured to perform the method of claim 1.

15. A vehicle comprising the processor device to perform the method of claim 1.

16. A computer program product comprising program code for performing, when executed by the processor device, the method of claim 1.

17. A control system comprising one or more control units configured to perform the method of claim 1.

18. A non-transitory computer-readable storage medium comprising instructions, which when executed by the processor device, cause the processor device to perform the method of claim 1.

* * * * *